US011300664B1

(12) United States Patent
Cao et al.

(10) Patent No.: US 11,300,664 B1
(45) Date of Patent: Apr. 12, 2022

(54) LIDAR ODOMETRY METHOD, SYSTEM AND APPARATUS BASED ON DIRECTED GEOMETRIC POINT AND SPARSE FRAME

(71) Applicants: INSTITUTE OF AUTOMATION, CHINESE ACADEMY OF SCIENCES, Beijing (CN); Beijing EnGo Technology Co., Ltd., Beijing (CN)

(72) Inventors: Zhiqiang Cao, Beijing (CN); Zhonghui Li, Beijing (CN); Jinli Kang, Beijing (CN); Min Tan, Beijing (CN); Shuang Liang, Beijing (CN); Chengpeng Wang, Beijing (CN)

(73) Assignees: INSTITUTE OF AUTOMATION, CHINESE ACADEMY OF SCIENCES, Beijing (CN); Beijing EnGo Technology Co., Ltd., Beijing (CN)

( * ) Notice: Subject to any disclaimer, the term of this patent is extended or adjusted under 35 U.S.C. 154(b) by 0 days.

(21) Appl. No.: 17/450,693

(22) Filed: Oct. 13, 2021

(30) Foreign Application Priority Data

Nov. 23, 2020 (CN) .......................... 202011323411.6

(51) Int. Cl.
*G01S 7/48* (2006.01)
*G01S 17/42* (2006.01)
(Continued)

(52) U.S. Cl.
CPC ............ *G01S 7/4808* (2013.01); *G01S 17/42* (2013.01); *G01S 17/89* (2013.01); *G06T 7/73* (2017.01); *G06T 2207/10028* (2013.01)

(58) Field of Classification Search
CPC ........ G01S 7/4808; G01S 17/42; G01S 17/89; G01S 17/931; G01S 17/86; G01S 7/4802;
(Continued)

(56) References Cited

U.S. PATENT DOCUMENTS

2014/0125663 A1* 5/2014 Zhang ..................... G06T 17/00
345/420
2020/0105001 A1* 4/2020 Rotenstein ........... G06K 9/6257
2020/0218929 A1 7/2020 Li et al.

FOREIGN PATENT DOCUMENTS

CN 101118622 A 2/2008
CN 109325972 A 2/2019
(Continued)

OTHER PUBLICATIONS

A Novel Sparse Geometric 3-D LiDAR Odometry Approach (Year: 2020).*
(Continued)

*Primary Examiner* — Yuqing Xiao
*Assistant Examiner* — Amir J Askarian
(74) *Attorney, Agent, or Firm* — Bayramoglu Law Offices LLC

(57) ABSTRACT

A LiDAR odometry method based on the directed geometric point and sparse frame includes: obtaining original three-dimensional point cloud data of a surrounding environment in the coordinate system of the current frame of the LiDAR sensor; constructing and converting the first directed geometric point set and first environmental directed geometric point set into the second directed geometric point set and second environmental directed geometric point set in the world coordinate system, respectively; calculating candidate associated points in the second environmental directed geometric point set in association with each point in the second directed geometric point set, and determining the best associated point of each point in the second directed geometric point set; constructing and solving a pose optimization function to obtain an optimized pose from the coordinate system of the current frame of the LiDAR sensor to the (Continued)

world coordinate system; and updating directed geometric point sets of sparse frames.

19 Claims, 2 Drawing Sheets

(51) Int. Cl.
*G06T 7/73* (2017.01)
*G01S 17/89* (2020.01)

(58) Field of Classification Search
CPC .......... G01S 7/497; G01S 17/875; G01S 7/48; G06T 7/73; G06T 2207/10028; G06T 15/10; G06T 17/00; G06T 2207/20044; G06T 2207/30172; G06T 7/13; G06T 7/155; G06T 2200/04; G06T 19/00; G06T 7/11; G06V 10/34; G06V 10/426; G06V 10/457; G06V 20/653
See application file for complete search history.

(56) References Cited

FOREIGN PATENT DOCUMENTS

| CN | 110389590 A | | 10/2019 | |
|---|---|---|---|---|
| CN | 110006408 B | * | 4/2020 | ............. G01C 11/34 |
| CN | 111275763 A | | 6/2020 | |
| CN | 111292369 A | * | 6/2020 | |
| CN | 111292369 A | | 6/2020 | |
| CN | 111612896 A | | 9/2020 | |

OTHER PUBLICATIONS

Direct Visual SLAM Using Sparse Depth for Camera-LiDAR System (Year: 2018).*
Deep Learning for 3D Point Clouds: A Survey (Year: 2020).*
Shuang Liang, et al., A Novel 3D LiDAR SLAM Based on Directed Geometry Point and Sparse Frame, IEEE Robotics and Automation Letters, 2021, pp. 374-381, vol. 6, No. 2.

* cited by examiner

LIDAR ODOMETRY METHOD, SYSTEM AND APPARATUS BASED ON DIRECTED GEOMETRIC POINT AND SPARSE FRAME

CROSS REFERENCE TO THE RELATED APPLICATIONS

This application is based upon and claims priority to Chinese Patent Application No. 202011323411.6, filed on Nov. 23, 2020, the entire contents of which are incorporated herein by reference.

TECHNICAL FIELD

The present invention relates to the technical field of service robots, and more particularly, to a LiDAR odometry method, system and apparatus based on the directed geometric point and the sparse frame.

BACKGROUND

With the rapid development of robot technologies, service robots have been applied to people's daily production and life. In order to successfully complete a task, the robot needs to determine its own position. Researchers in China and other countries have conducted in-depth researches on robot localization. Vision sensor and LiDAR sensor are two main sensors for realizing robot localization. Methods for positioning the robot in an unknown environment by using the visual sensor and the LiDAR sensor are referred to as visual odometry and LiDAR odometry, respectively. The visual odometry is sensitive to illumination change and the change of viewing angle, and cannot work effectively in low texture environments. Compared with the visual odometry, the LiDAR odometry can better adapt to the illumination change and the change of viewing angle, and the LiDAR sensor provides accurate distance information. At present, the LiDAR odometry has become a hot spot. A common strategy in the LiDAR odometry is to optimize the pose of current frame by continuously matching point cloud data of the current frame and the previous frame of the LiDAR sensor, which is referred to as frame-to-frame matching. Since only point cloud data of two adjacent frames is matched in frame-to-frame matching, pose estimation is of low accuracy. Another strategy is to optimize the pose of the current frame by matching point cloud data of the current frame and a map, which is referred to as frame-to-map matching. Specifically, the map is usually created based on point cloud data of a plurality of frames before the current frame. Since the point cloud data of the plurality of frames is considered in frame-to-map matching, pose estimation is of high accuracy. The LiDAR odometry method based on frame-to-map matching has become a focus of current research. Representative LiDAR odometry methods based on frame-to-map matching include LiDAR odometry and mapping (LOAM), lightweight and ground-optimized LiDAR odometry and mapping (LeGO-LOAM), implicit moving least squares-simultaneous localization and mapping (IMLS-SLAM), and so on. A nonlinear optimization algorithm is usually used in the pose estimation process, and representative algorithms include Gauss-Newton (GM) algorithm and Levenberg-Marquardt (LM) algorithm. In addition, for three-dimensional (3D) point cloud data obtained by the LiDAR sensor, processing (including Euclidean clustering, fitting, and the like) is usually performed by directly using the point cloud library (PCL), which is widely applied in the fields of service robots and unmanned driving.

In traditional frame-to-map matching, the map is usually constructed directly by accumulating point clouds of all frames before the current frame, and then pose optimization is executed by matching the current frame and the map. As a result, there will be a huge quantity of points in the map, which seriously affects the efficiency of frame-to-map matching. There are usually two types of solutions to improve the efficiency of frame-to-map matching. In the first type of solution, the map is constructed by accumulating only geometric points of each frame, and the extraction strategy of geometric point in LOAM is a representative one. This type of solution effectively reduces the quantity of points in the map. However, plane fitting is required in the process of frame-to-map matching to obtain the normal vector of the plane on which the point is located, thus it is still necessary to maintain a high-density point cloud distribution in the map. For the second type of solution, the map is constructed by accumulating point cloud information of limited consecutive frames before the current frame. This type of solution can reduce the quantity of points in the map to a certain extent, but it is still difficult to ensure real-time performance of frame-to-map matching. Therefore, the existing LiDAR odometry methods based on frame-to-map matching need to be further studied to resolve the problem of low efficiency of frame-to-map matching due to the large quantity of points stored in the map in the prior art.

SUMMARY

To resolve the above problem in the prior art, in other words, to resolve a problem of low efficiency of frame-to-map matching in existing LiDAR odometry methods, the present invention provides a LiDAR odometry method based on the directed geometric point and the sparse frame. The method includes the following steps:

step S100: sensing an environment by a service robot through a LiDAR sensor, and obtaining original 3D point cloud data of the surrounding environment in the coordinate system of the current frame of the LiDAR sensor;

step S200: selecting the planar points from the original 3D point cloud data, performing clustering on the planar points to obtain planar point sets, performing plane fitting on each planar point set, using the central position and unit normal vector of each fitted plane as the position and direction of corresponding directed geometric point, constructing the first directed geometric point set based on the obtained directed geometric points, and merging directed geometric point sets corresponding to N sparse frames before the current frame to obtain the first environmental directed geometric point set, where the sparse frames are selected from all frames obtained by the LiDAR sensor based on a predetermined pose spacing threshold;

step S300: converting the first directed geometric point set into the second directed geometric point set in the world coordinate system based on the directed geometric point conversion relationship between the coordinate system of the current frame of the LiDAR sensor and the world coordinate system, and converting the first environmental directed geometric point set into the second environmental directed geometric point set in the world coordinate system based on the directed geometric point conversion relationship between the coordinate systems corresponding to the N sparse frames before the current frame and the world coordinate system;

step S400: calculating candidate associated points in the second environmental directed geometric point set in association with each point in the second directed geometric point set according to a preset data association rule of directed geometric point, and determining the best associated point of each point in the second directed geometric point set;

step S500: constructing a pose optimization function by minimizing a square sum of distances from positions of the points in the second directed geometric point set to planes in which the corresponding best associated points in the second environmental directed geometric point set are located, and obtaining an optimized pose from the coordinate system of the current frame of the LiDAR sensor to the world coordinate system by solving the pose optimization function using LM algorithm, where the plane in which the best associated point is located refers to the one that passes through the position of the best associated point and regards the direction of the best associated point as its normal vector; and step S600: calculating a spacing between the optimized pose from the coordinate system of the current frame of the LiDAR sensor to the world coordinate system and the optimized pose corresponding to the nearest sparse frame; and when the spacing is greater than or equal to the predetermined pose spacing threshold, using the current frame as a new sparse frame, and generating the directed geometric point set corresponding to the current frame based on the best associated points, otherwise, updating the directed geometric point sets of the N sparse frames before the current frame based on the points in the second directed geometric point set; and then returning to step S100.

In some preferred implementations, in step S200, a method for selecting the planar points from the original 3D point cloud data, performing clustering on the planar points to obtain planar point sets, and performing plane fitting on each planar point set includes:

extracting the planar points in the original 3D point cloud data according to the geometric point extraction strategy in LOAM;

performing clustering on the extracted planar points by using the K-dimensional tree (KD-tree) algorithm in the PCL point cloud library based on a preset search radius to obtain the corresponding planar point sets; and performing plane fitting on each planar point set by using the random sample consensus (RANSAC) algorithm in the PCL point cloud library.

In some preferred implementations, the directed geometric point conversion relationship between the coordinate system of the current frame of the LiDAR sensor and the world coordinate system is as follows:

$$(\hat{p}_i, \hat{n}_i) = (R_{wl} p_i + t_{wl}, R_{wl} n_i)$$

where $p_i$ and $n_i$ respectively represent the position and direction of the $i^{th}$ directed geometric point in the first directed geometric point set; $R_{wl}$ and $t_{wl}$ respectively represent the rotation matrix and translation vector of the initialized pose $T_{wl}$ from the coordinate system $O_l X_l Y_l Z_l$ of the current frame of the LiDAR sensor to the world coordinate system $O_w X_w Y_w Z_w$; when $$l \leq 2, T_{wl} = \begin{bmatrix} I & 0 \\ 0 & 1 \end{bmatrix},$$

and I represents a 3×3 unit matrix; when $l>2$, $T_{wl} = T^*_{w(l-1)} (T^*_{w(l-2)})^{-1} T^*_{w(l-1)}$, $T^*_{w(l-2)}$ and $T^*_{w(l-1)}$ respectively represent the optimized pose from the coordinate system of the $(l-2)^{th}$ frame of the LiDAR sensor to the world coordinate system and the optimized pose from the coordinate system of the $(l-1)^{th}$ frame of the LiDAR sensor to the world coordinate system, l represents the current frame, and $(\hat{p}_i, \hat{n}_i)$ represents the expression in the world coordinate system of the point $(p_i, n_i)$ in the first directed geometric point set; and the directed geometric point conversion relationship between the coordinate systems corresponding to the N sparse frames before the current frame and the world coordinate system is as follows:

$$(\hat{p}_{x,j}, \hat{n}_{x,j}) = (R^*_{wf_x} p_{x,j} + t^*_{wf_x}, R^*_{wf_x} n_{x,j})$$

where $(\hat{p}_{x,j}, \hat{n}_{x,j})$ represents the expression in the world coordinate system of the point $(p_{x,j}, n_{x,j})$ in the first environmental directed geometric point set $$R^*_{wf_x}$$

and $$t^*_{wf_x}$$

respectively represent the rotation matrix and translation vector of the optimized pose $$T^*_{wf_x}$$

from the coordinate system corresponding to the sparse frame $L_{f_x}$ (x=1, 2, . . . , N) to the world coordinate system, j=1, 2, . . . $|Q_x|$, and $|Q_x|$ is the number of points in the directed geometric point set $Q_x$.

In some preferred implementations, in step S400, a method for calculating the candidate associated points in the second environmental directed geometric point set in association with each point in the second directed geometric point set according to the preset data association rule of the directed geometric point includes:

calculating point-to-point distances between the point in the second directed geometric point set and points in the second environmental directed geometric point set, and selecting points with corresponding point-to-point distances less than the first preset distance threshold in the second environmental directed geometric point set to construct a point set $\Omega_{dd}$; and calculating point-to-plane distances between the point in the second directed geometric point set and planes in which points in the point set $\Omega_{dd}$ are located, and using points with corresponding point-to-plane distances less than the second preset distance threshold in the point set $\Omega_{dd}$ as the candidate associated points, where the plane in which a point in the point set $\Omega_{dd}$ is located refers to the one that passes through the position of this point and regards the direction of this point as its normal vector.

In some preferred implementations, a method for constructing the pose optimization function is as follows:

$$T^*_{wl} = \underset{T_{wl} \in \mathbb{SE}_3}{\mathrm{argmin}} \sum_{i=1}^{|P_2|} \|(R_{wl} p_i + t_{wl} - \hat{p}_{x^*, j^*})^T \hat{n}_{x^*, j^*}\|^2$$

where $T^*_{wl}$ represents the optimized pose, $p_i$ represents the position of the point in the first directed geometric point set in correspondence to the point $(\hat{p}_i,\hat{n}_i)$ in the second directed geometric point set, $\hat{p}_{x^*,y^*}$ and $\hat{n}_{x^*,y^*}$ respectively represent the position and direction of the best associated point in the second environmental directed geometric point set in association with the point $(\hat{p}_i,\hat{n}_i)$, $(\bullet)^T$ represents the matrix transpose operator, $\mathbb{SE}_3$ represents the manifold space where the poses are located, and $|P_2|$ represents the number of points in the second directed geometric point set.

In some preferred implementations, in step S600, a method for, when the spacing is greater than or equal to the predetermined pose spacing threshold, using the current frame as the new sparse frame, and generating the directed geometric point set corresponding to the current frame based on the best associated points, otherwise, updating the directed geometric point sets of the N sparse frames before the current frame based on the points in the second directed geometric point set, includes:

when the spacing is greater than or equal to the predetermined pose spacing threshold, using the current frame as the new sparse frame, updating the corresponding points in the second directed geometric point set based on the best associated points, projecting updated points in the second directed geometric point set from the world coordinate system to the coordinate system of the current frame of the LiDAR sensor, and constructing a directed geometric point set corresponding to the current new sparse frame based on projected directed geometric points; or otherwise, updating the corresponding best associated points based on the points in the second directed geometric point set, projecting each updated best associated point to the coordinate system of the sparse frame corresponding to this updated best association point, and replacing the corresponding points in the sparse frame with the projected directed geometric points.

A second aspect of the present invention provides a LiDAR odometry system based on the directed geometric point and the sparse frame. The system includes an acquisition module, a directed geometric point extraction module, a conversion module, an association module, a pose optimization module, and a directed geometric point updating module, where the acquisition module is configured to sense an environment by a service robot through a LiDAR sensor, and obtain original 3D point cloud data of the surrounding environment in the coordinate system of the current frame of the LiDAR sensor;

the directed geometric point extraction module is configured to select the planar points from the original 3D point cloud data, perform clustering on the planar points to obtain planar point sets, perform plane fitting on each planar point set, use the central position and unit normal vector of each fitted plane as the position and direction of corresponding directed geometric point, construct the first directed geometric point set based on the obtained directed geometric points, and merge directed geometric point sets corresponding to N sparse frames before the current frame to obtain the first environmental directed geometric point set, where the sparse frames are selected from all frames obtained by the LiDAR sensor based on a predetermined pose spacing threshold;

the conversion module is configured to convert the first directed geometric point set into the second directed geometric point set in the world coordinate system based on the directed geometric point conversion relationship between the coordinate system of the current frame of the LiDAR sensor and the world coordinate system, and convert the first environmental directed geometric point set into the second environmental directed geometric point set in the world coordinate system based on the directed geometric point conversion relationship between the coordinate systems corresponding to the N sparse frames before the current frame and the world coordinate system;

the association module is configured to calculate candidate associated points in the second environmental directed geometric point set in association with each point in the second directed geometric point set according to a preset data association rule of directed geometric point, and determine the best associated point of each point in the second directed geometric point set;

the pose optimization module is configured to construct a pose optimization function by minimizing a square sum of distances from positions of the points in the second directed geometric point set to planes in which the corresponding best associated points in the second environmental directed geometric point set are located, and obtain an optimized pose from the coordinate system of the current frame of the LiDAR sensor to the world coordinate system by solving the pose optimization function using LM algorithm, where the plane in which the best associated point is located refers to the one that passes through the position of the best associated point and regards the direction of the best associated point as its normal vector; and the directed geometric point updating module is configured to calculate a spacing between the optimized pose from the coordinate system of the current frame of the LiDAR sensor to the world coordinate system and the optimized pose corresponding to the nearest sparse frame; and when the spacing is greater than or equal to the predetermined pose spacing threshold, use the current frame as a new sparse frame, and generate the directed geometric point set corresponding to the current frame based on the best associated points, otherwise, update the directed geometric point sets of the N sparse frames before the current frame based on the points in the second directed geometric point set; and then return to the acquisition module.

A third aspect of the present invention provides a storage apparatus, where the storage apparatus stores a plurality of programs, and the programs are loaded and executed by a processor to implement the above LiDAR odometry method based on the directed geometric point and the sparse frame.

A fourth aspect of the present invention provides a processing apparatus, including a processor and a storage apparatus, where the processor is configured to execute each program; the storage apparatus is configured to store a plurality of programs; and the programs are loaded and executed by the processor to implement the above LiDAR odometry method based on the directed geometric point and the sparse frame.

Beneficial Effects of the Present Invention

The present invention improves efficiency of frame-to-map matching in LiDAR odometry.

(1) In the present invention, the directed geometric point is used to replace geometric point in traditional frame-to-map matching. Compared with the geometric point, the directed geometric point has direction information. In this way, in frame-to-map matching, the step of plane fitting is omitted, and only sparse directed geometric points need to be maintained in a map, thereby improving the efficiency of frame-to-map matching.

(2) To reduce redundant points of adjacent frames in the map, the present invention only accumulates points of limited sparse frames before the current frame into the map, further reducing the number of points in the map. This improves the efficiency of frame-to-map matching, and provides technical support for localization of a service robot in environments such as home, office, and medical care.

DETAILED DESCRIPTION OF THE EMBODIMENTS

In order to make the objectives, technical solutions, and advantages of the present invention clearer, the technical solutions in the embodiments of the present invention are described clearly and completely below with reference to the accompanying drawings. Apparently, the described embodiments are part rather than all of the embodiments. All other embodiments obtained by a person of ordinary skill in the art based on the embodiments of the present invention without creative efforts shall fall within the protection scope of the present invention.

The present invention will be further described in detail below with reference to the accompanying drawings and embodiments. It may be understood that the specific embodiments described herein are merely intended to explain the related disclosure, rather than to limit the present invention. It should also be noted that, for convenience of description, only the parts related to the related disclosure are shown in the accompany drawings.

It should be noted that the embodiments in the present invention and features in the embodiments may be combined with each other if no conflict occurs.

Figure 1:
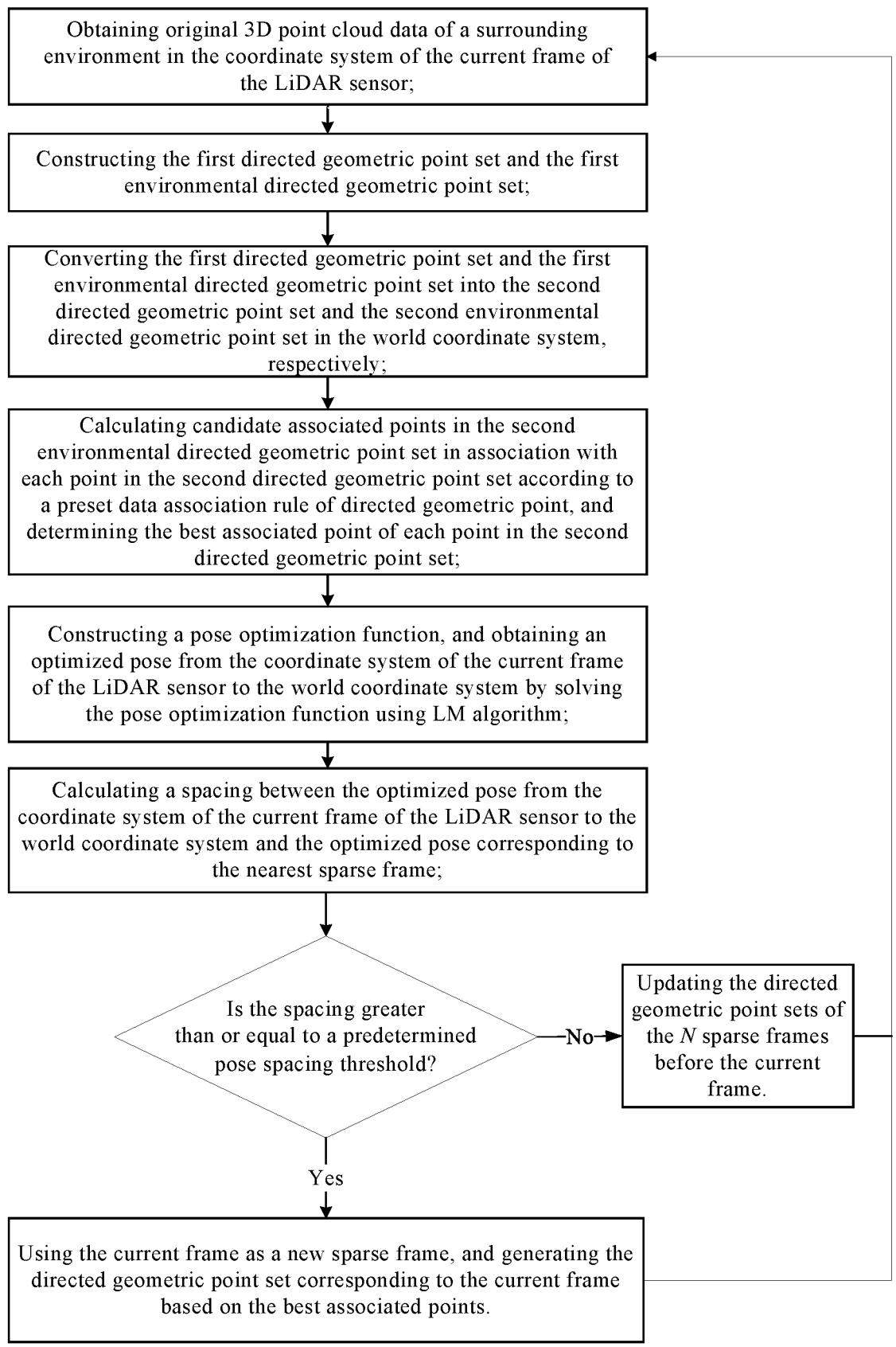
FIG. 1 is a schematic flowchart of a LiDAR odometry method based on the directed geometric point and the sparse frame according to an embodiment of the present invention.

As shown in FIG. 1, a LiDAR odometry method based on the directed geometric point and the sparse frame in the present invention includes the following steps:

Step S100: Sense an environment by a service robot through a LiDAR sensor, and obtain original 3D point cloud data of the surrounding environment in the coordinate system of the current frame of the LiDAR sensor.

Step S200: Select the planar points from the original 3D point cloud data, perform clustering on the planar points to obtain planar point sets, perform plane fitting on each planar point set, use the central position and unit normal vector of each fitted plane as the position and direction of corresponding directed geometric point, construct the first directed geometric point set based on the obtained directed geometric points, and merge directed geometric point sets corresponding to N sparse frames before the current frame to obtain the first environmental directed geometric point set, where the sparse frames are selected from all frames obtained by the LiDAR sensor based on a predetermined pose spacing threshold.

Step S300: Convert the first directed geometric point set into the second directed geometric point set in the world coordinate system based on the directed geometric point conversion relationship between the coordinate system of the current frame of the LiDAR sensor and the world coordinate system, and convert the first environmental directed geometric point set into the second environmental directed geometric point set in the world coordinate system based on the directed geometric point conversion relationship between the coordinate systems corresponding to the N sparse frames before the current frame and the world coordinate system.

Step S400: Calculate candidate associated points in the second environmental directed geometric point set in association with each point in the second directed geometric point set according to a preset data association rule of directed geometric point, and determine the best associated point of each point in the second directed geometric point set.

Step S500: Construct a pose optimization function by minimizing a square sum of distances from positions of the points in the second directed geometric point set to planes in which the corresponding best associated points in the second environmental directed geometric point set are located, and obtain an optimized pose from the coordinate system of the current frame of the LiDAR sensor to the world coordinate system by solving the pose optimization function using LM algorithm, where the plane in which the best associated point is located refers to the one that passes through the position of the best associated point and regards the direction of the best associated point as its normal vector.

Step S600: Calculate a spacing between the optimized pose from the coordinate system of the current frame of the LiDAR sensor to the world coordinate system and the optimized pose corresponding to the nearest sparse frame; and when the spacing is greater than or equal to the predetermined pose spacing threshold, use the current frame as a new sparse frame, and generate the directed geometric point set corresponding to the current frame based on the best associated points, otherwise, update the directed geometric point sets of the N sparse frames before the current frame based on the points in the second directed geometric point set; and then return to step S100.

To more clearly explain the LiDAR odometry method based on the directed geometric point and the sparse frame in the present invention, steps in an embodiment of the method in the present invention are described in detail below with reference to the accompanying drawings.

Step S100: Sense an environment by a service robot through a LiDAR sensor, and obtain original 3D point cloud data of the surrounding environment in the coordinate system of the current frame of the LiDAR sensor.

In this embodiment, the service robot obtains, by using its own LiDAR sensor, the original 3D point cloud data $D_s$ of the surrounding environment in the coordinate system $O_l X_l Y_l Z_l$ of the current frame of the LiDAR sensor. The coordinate system $O_l X_l Y_l Z_l$ of the current frame of the LiDAR sensor is a right-hand system, where the origin $O_l$ of $O_l X_l Y_l Z_l$ is located at the center of the LiDAR sensor. $Z_l$ axis is perpendicular to the bottom surface of the LiDAR sensor with an upward direction, and $X_l$ axis is perpendicular to the $Z_l$ axis and it is consistent with the forward direction of the LiDAR sensor. 1 is a positive integer, indicating that the current frame is the $1^{th}$ frame. Preferably, the LiDAR sensor is Velodyne HDL64.

Step S200: Select the planar points from the original 3D point cloud data, perform clustering on the planar points to obtain planar point sets, perform plane fitting on each planar point set, use the central position and unit normal vector of each fitted plane as the position and direction of corresponding directed geometric point, construct the first directed geometric point set based on the obtained directed geometric points, and merge directed geometric point sets corresponding to N sparse frames before the current frame to obtain the first environmental directed geometric point set, where the sparse frames are selected from all frames obtained by the LiDAR sensor based on a predetermined pose spacing threshold.

In this embodiment, the first directed geometric point set $P_1$ is obtained from the original 3D point cloud data $D_s$, and the directed geometric point sets of the N sparse frames before the current frame are merged to obtain the first environmental directed geometric point set $R_1$, where N is a preset value, and is preferably set to 32 in the present invention. The directed geometric point is a geometric point that has a direction and whose curvature is less than $\sigma_c$, where $\sigma_c$ represents a preset curvature threshold, and is preferably set to 0.1 in the present invention. The sparse frame is a frame that is selected from all the frames obtained by the LiDAR sensor, according to a rule that the pose spacing between two adjacent sparse frames is not less than $d_f$, where $d_f$ is the predetermined pose spacing threshold, and is preferably set to 2 m in the present invention. A specific process is as follows:

Geometric points are extracted from the original 3D point cloud data $D_s$ according to the geometric point extraction strategy in LOAM, where the geometric points whose curvatures are less than $\sigma_c$ are referred to as the planar points. Then, these planar points are clustered with $r_s$ as the search radius by using the KD-tree algorithm in the PCL point cloud library, and $N_1$ planar point sets are obtained, where $r_s$ represents the preset search radius, and is preferably set to 1 m in the present invention. Plane fitting is performed on each planar point set by using the random sample consensus (RANSAC) algorithm in the PCL point cloud library, to obtain the plane $A_p$. The central position and the unit normal vector of the plane $A_p$ are used to represent the position and the direction of the directed geometric point. Based on the obtained directed geometric points, the first directed geometric point set $P_1=\{(p_i,n_i)|i=1, 2, \ldots, N_1\}$ is constructed, where $p_i$ and $n_i$ represent the position and direction of the $i^{th}$ directed geometric point in $P_1$, respectively.

The directed geometric point sets $Q_x=\{(p_{x,j},n_{x,j})|j=1, 2, \ldots, |Q_x|\}$ corresponding to the N sparse frames $L_{f_x}$ (x=1, 2, \ldots, N)($1 \le f_1 < f_2 < \ldots < f_N < l$) before the current frame are merged to obtain the first environmental directed geometric point set $R_1=\cup_{x=1}^{N} Q_x$, where $|Q_x|$ is the number of points in the directed geometric point set $Q_x$, and $p_{x,j}$ and $n_{x,j}$ represent the position and direction of $j^{th}$ directed geometric point in the $x^{th}$ sparse frame before the current frame, respectively.

Step S300: Convert the first directed geometric point set into the second directed geometric point set in the world coordinate system based on the directed geometric point conversion relationship between the coordinate system of the current frame of the LiDAR sensor and the world coordinate system, and convert the first environmental directed geometric point set into the second environmental directed geometric point set in the world coordinate system based on the directed geometric point conversion relationship between the coordinate systems corresponding to the N sparse frames before the current frame and the world coordinate system.

In this embodiment, the first directed geometric point set $P_1$ is converted into the second directed geometric point set $P_2$ in the world coordinate system based on the directed geometric point conversion relationship between the coordinate system $O_l X_l Y_l Z_l$ of the current frame of the LiDAR sensor and the world coordinate system $O_w X_w Y_w Z_w$, and the first environmental directed geometric point set $R_1$ is converted into the second environmental directed geometric point set $R_2$ in the world coordinate system based on the directed geometric point conversion relationship between the coordinate systems $O_{f_x} X_{f_x} Y_{f_x} Z_{f_x}$ (x=1, 2, \ldots, N) corresponding to the N sparse frames $L_{f_x}$ before the current frame and the world coordinate system. The world coordinate system $O_w X_w Y_w Z_w$ represents the coordinate system in which $1^{st}$ frame of the LiDAR sensor is located, namely, $O_l X_l Y_l Z_l$ when l=1.

The directed geometric point conversion relationship between the coordinate system $O_l X_l Y_l Z_l$ of the current frame of the LiDAR sensor and the world coordinate system $O_w X_w Y_w Z_w$ is as follows: $(\hat{p}_i, \hat{n}_i) = (R_{wl} p_i + t_{wl}, R_{wl} n_i)$, where represents the expression in the world coordinate system $O_w X_w Y_w Z_w$ of the point $(p_i, n_i)$ in the first directed geometric point set $P_1$; $R_{wl}$ and $t_{wl}$ represent the rotation matrix and translation vector of the initialized pose $T^*_{wl}$ from the coordinate system $O_l X_l Y_l Z_l$ of the current frame of the LiDAR sensor to the world coordinate system $O_w X_w Y_w Z_w$, respectively; when $$l \le 2, T_{wl} = \begin{bmatrix} I & 0 \\ 0 & 1 \end{bmatrix},$$

and I represents a 3×3 unit matrix; when l>2, $T_{wl} = T^*_{w(l-1)} (T^*_{w(l-2)})^{-1} T^*_{w(l-1)}$, and $T^*_{w(l-2)}$ and $T^*_{w(l-1)}$ represent the optimized pose from the coordinate system $O_{l-2} X_{l-2} Y_{l-2} Z_{l-2}$ of the (l-2)$^{th}$ frame of the LiDAR sensor to the world coordinate system $O_w X_w Y_w Z_w$ and the optimized pose from the coordinate system $O_{l-1} X_{l-1} Y_{l-1} Z_{l-1}$ of the (l-1)$^{th}$ frame of the LiDAR sensor to the world coordinate system $O_w X_w Y_w Z_w$, respectively. All converted directed geometric points constitute the second directed geometric point set $P_2$.

The directed geometric point conversion relationship between the coordinate systems $O_{f_x} X_{f_x} Y_{f_x} Z_{f_x}$ (x=1, 2, \ldots, N) corresponding to the N sparse frames $L_{f_x}$ before the current frame and the world coordinate system $O_w X_w Y_w Z_w$ is as follows: $(\hat{p}_{x,j}, \hat{n}_{x,j}) = (R^*_{wf_x} p_{x,j} + t^*_{wf_x}, R^*_{wf_x} n_{x,j})$, where j=1, 2, \ldots $|Q_x|$, $(\hat{p}_{x,j}, \hat{n}_{x,j})$ represents the expression in the world coordinate system $O_w X_w Y_w Z_w$ of the point $(p_{x,j}, n_{x,j})$ in the first environmental directed geometric point set $R_1$, and $$R^*_{wf_x}$$

and $$t^*_{wf_x}$$

represent the rotation matrix and translation vector of the optimized pose $$T^*_{wf_x}$$

from the coordinate system $O_{f_x} X_{f_x} Y_{f_x} Z_{f_x}$ corresponding to the sparse frame $L_{f_x}$ to the world coordinate system $O_w X_w Y_w Z_w$, respectively. All converted directed geometric points constitute the second environmental directed geometric point set $R_2$.

Step S400: Calculate candidate associated points in the second environmental directed geometric point set in association with each point in the second directed geometric point set according to a preset data association rule of directed geometric point, and determine the best associated point of each point in the second directed geometric point set.

In this embodiment, the candidate associated points in the second environmental directed geometric point set $R_2$ in association with each point in the second directed geometric point set $P_2$ is calculated according to the preset data association rule of the directed geometric point, and the best associated point of each point in the second directed geometric point set is further determined.

For each directed geometric point in the second directed geometric point set $P_2$, associated points meeting the data association rule of the directed geometric point, namely, associated points meeting both point-to-point distance constraint and point-to-plane distance constraint, are searched in the second environmental directed geometric point set $R_2$ as the candidate associated points. A candidate associated point with a minimum point-to-plane distance is further selected as the best associated point. A specific process is as follows:

Step S410: For the point $(\hat{p}_i,\hat{n}_i)$ in the second directed geometric point set $P_2$, search for, by using the KD-tree algorithm in the PCL point cloud library, points meeting the point-to-point distance constraint, namely, $\|\hat{p}_i-\hat{p}_{x,j}\|<r$, in the second environmental directed geometric point set $R_2$, to constitute a point set $\Omega_{dd}$, where $(\hat{p}_{x,j},\hat{n}_{x,j})\in R_2$, represents the Euclidean norm, r represents the first preset distance threshold, and is preferably set to 2 m in the present invention; denote (p,n) as a point in $\Omega_{dd}$, and select, in the point set $\Omega_{dd}$, points meeting the point-to-plane distance constraint that the distance $\|(\hat{p}_i-p)^T n\|$ from $\hat{p}_i$ to the plane in which (p,n) is located is less than d, to constitute a candidate associated point set $\Omega_c$ of $(\hat{p}_i,\hat{n}_i)$, where the plane in which (p,n) is located refers to the one that passes through the position p of this point and regards the direction n of this point as its normal vector, and d represents the second preset distance threshold, and is preferably set to 0.5 m in the present invention.

Step S420: Search for a point with a minimum point-to-plane distance $\|(\hat{p}_i-p')^T n'\|$ in the candidate associated point set $\Omega_c$, and denote the point as $(\hat{p}_{x^*,j^*},\hat{n}_{x^*,j^*})$, where $(p',n') \in \Omega_c$, and the point $(\hat{p}_{x^*,j^*},\hat{n}_{x^*,j^*})$ is referred to as the best associated point, in the second environmental directed geometric point set $R_2$, of the point $(\hat{p}_i,\hat{n}_i)$ in the second directed geometric point set $P_2$.

Step S500: Construct a pose optimization function by minimizing a square sum of distances from positions of the points in the second directed geometric point set to planes in which the corresponding best associated points in the second environmental directed geometric point set are located, and obtain an optimized pose from the coordinate system of the current frame of the LiDAR sensor to the world coordinate system by solving the pose optimization function using LM algorithm, where the plane in which the best associated point is located refers to the one that passes through the position of the best associated point and regards the direction of the best associated point as its normal vector.

In this embodiment, the pose optimization function is constructed by minimizing the square sum of the distances from the positions of the points in the second directed geometric point set $P_2$ to the planes in which the corresponding best associated points in the second environmental directed geometric point set $R_2$ are located; and the pose optimization function is converted from the manifold space into the Euclidean space, and the optimized pose $T^*_{wl}$ from the coordinate system $O_l X_l Y_l Z_l$ of the current frame of the LiDAR sensor to the world coordinate system $O_w X_w Y_w Z_w$ is obtained by the LM algorithm.

The pose optimization function is constructed according to the following formula (1):

$$T^*_{wl} = \underset{T_{wl}\in \mathbb{SE}_3}{\operatorname{argmin}} \sum_{i=1}^{|P_2|} \|(R_{wl}p_i + t_{wl} - \hat{p}_{x^*,j^*})^T \hat{n}_{x^*,j^*}\|^2 \quad (1)$$

In the above formula, $p_i$ represents the position of the point in the first directed geometric point set $P_1$ in correspondence to the point $(\hat{p}_i,\hat{n}_i)$ in the second directed geometric point set $P_2$, $\hat{p}_{x^*,j^*}$ and $\hat{n}_{x^*,j^*}$ respectively represent the position and direction of the best associated point in the second environmental directed geometric point set $R_2$ in association with the point $(\hat{p}_i,\hat{n}_i)$, $(\bullet)^T$ represents the matrix transpose operator, $\mathbb{SE}_3$ represents the manifold space where the poses are located, and $|P_2|$ represents the number of points in the second directed geometric point set $P_2$.

The pose optimization function is solved using the LM algorithm. At first, a retraction mapping is given for any pose T in $\mathbb{SE}_3$:

$$\mathcal{R}_T(\delta\phi, \delta t) = \begin{bmatrix} R\operatorname{Exp}(\delta\phi) & R\delta t + t \\ 0 & 1 \end{bmatrix},$$

where R and t represent the rotation matrix and translation vector of T, respectively, $\delta\phi$ and $\delta t$ represent pose increments, $(\delta\phi,\delta t)\in \mathbb{R}_6$, $\mathbb{R}_6$ represents 6-dimensional Euclidean space, and $\operatorname{Exp}(\delta\phi)$ represents the uppercase exponential mapping of $\delta\phi$. In the pose optimization function shown in the formula (1), $T_{wl}$ is replaced with $\mathcal{R}_{T_{wl}}(\delta\phi,\delta t)$, in other words, $R_{wl}$ is replaced with $R_{wl}\operatorname{Exp}(\delta\phi)$, and $t_{wl}$ is replaced with $R_{wl}\delta t + t_{wl}$. In this way, the pose optimization problem is converted into an equivalence problem in the Euclidean space $\mathbb{R}_6$:

$$(\delta\phi^*, \delta t^*) = \underset{(\delta\phi,\delta t)\in \mathbb{R}_6}{\operatorname{argmin}} \sum_{i=1}^{|P_2|} \|(R_{wl}\operatorname{Exp}(\delta\phi)p_i + R_{wl}\delta t + t_{wl} - \hat{p}_{x^*,j^*})^T \hat{n}_{x^*,j^*}\|^2,$$

where $(\delta\phi^*,\delta t^*)$ is solved directly using the LM algorithm, and the optimized pose $T^*_{wl}=\mathcal{R}_{T_{wl}}(\delta\phi^*,\delta t^*)$ from the coordinate system $O_l X_l Y_l Z_l$ of the current frame of the LiDAR sensor to the world coordinate system $O_w X_w Y_w Z_w$ is further obtained.

Step S600: Calculate a spacing between the optimized pose from the coordinate system of the current frame of the LiDAR sensor to the world coordinate system and the optimized pose corresponding to the nearest sparse frame; and when the spacing is greater than or equal to the predetermined pose spacing threshold, use the current frame as a new sparse frame, and generate the directed geometric point set corresponding to the current frame based on the best associated points, otherwise, update the directed geometric point sets of the N sparse frames before the current frame based on the points in the second directed geometric point set; and then return to step S100.

In this embodiment, whether the current frame is a new sparse frame is determined based on the optimized pose $T^*_{wl}$ from the coordinate system $O_l X_l Y_l Z_l$ of the current frame of the LiDAR sensor to the world coordinate system $O_w X_w Y_w Z_w$, and the optimized pose $$T^*_{wf_N}$$

from the coordinate system $O_{f_N} X_{f_N} Y_{f_N} Z_{f_N}$ corresponding to the sparse frame nearest to the current frame to the world coordinate system $O_w X_w Y_w Z_w$. If the current frame is a new sparse frame, the directed geometric point set of the current frame is generated. If the current frame is not a new sparse frame, the directed geometric point sets of the N sparse frames before the current frame are updated.

Whether the current frame is a new sparse frame is determined based on the spacing between $T^*_{wl}$ and $$T^*_{wf_N}.$$

When $\|t^*_{wl} - t^*_{wf_N}\| \geq d_f$, the current frame is regarded as a new sparse frame, where $t^*_{wl}$ represents the translation vector of the optimized pose $T^*_{wl}$ from $O_l X_l Y_l Z_l$ to $O_w X_w Y_w Z_w$, and $t^*_{wf_N}$ represents the translation vector of the optimized pose $$T^*_{wf_N}$$

from $O_{f_N} X_{f_N} Y_{f_N} Z_{f_N}$ to $O_w X_w Y_w Z_w$.

If the current frame is a new sparse frame, the point $(\hat{p}_i, \hat{n}_i)$ in the second directed geometric point set $P_2$ is updated based on the best associated point $(\hat{p}_{x^*,j^*}, \hat{n}_{x^*,j^*})$ in the second environmental directed geometric point set $R_2$. An update process is shown in formulas (2) and (3):

$$\hat{p}_i \leftarrow \alpha \hat{p}_{x^*,j^*} + (1-\alpha)\hat{p}_i \tag{2}$$

$$\hat{n}_i \leftarrow \frac{\alpha \hat{n}_{x^*,j^*} + (1-\alpha)\hat{n}_i}{\|\alpha \hat{n}_{x^*,j^*} + (1-\alpha)\hat{n}_i\|} \tag{3}$$

In the above formulas, $\alpha \in (0,1)$ represents a preset update weight, and is preferably set to 0.9 in the present invention. Then, the updated point $(\hat{p}_i, \hat{n}_i)$ in the second directed geometric point set $P_2$ is projected from the world coordinate system $O_w X_w Y_w Z_w$ to the coordinate system $O_l X_l Y_l Z_l$ of the current frame of the LiDAR sensor, to obtain $(\hat{p}_i, \hat{n}_i)$, where $\hat{p}_i = (R^*_{wl})^T(\hat{p}_i - t^*_{wl})$, $\hat{n}_i = (R^*_{wl})^T \hat{n}_i$, and $R^*_{wl}$ and $t^*_{wl}$ represent the rotation matrix and translation vector of the optimized pose $T^*_{wl}$ from $O_l X_l Y_l Z_l$ to $O_w X_w Y_w Z_w$ respectively. The projected directed geometric points constitutes the directed geometric point set $Q_{N+1}$ corresponding to the current new sparse frame, and $Q_1, Q_2, \ldots,$ and $Q_N$ are replaced with $Q_2, Q_3, \ldots,$ and $Q_{N+1}$, respectively.

If the current frame is not a new sparse frame, the best association point $(\hat{p}_{x^*,j^*}, \hat{n}_{x^*,j^*})$ in the second environmental directed geometric point set $R_2$ is updated based on the point $(\hat{p}_i, \hat{n}_i)$ in the second directed geometric point set $P_2$. An update process is shown in formulas (4) and (5):

$$\hat{p}_{x^*,j^*} \leftarrow \alpha \hat{p}_{x^*,j^*} + (1-\alpha)\hat{p}_i \tag{4}$$

$$\hat{n}_{x^*,j^*} \leftarrow \frac{\alpha \hat{n}_{x^*,j^*} + (1-\alpha)\hat{n}_i}{\|\alpha \hat{n}_{x^*,j^*} + (1-\alpha)\hat{n}_i\|} \tag{5}$$

Then, the updated $(\hat{p}_{x^*,j^*}, \hat{n}_{x^*,j^*})$ is projected to the coordinate system $O_{f_{x^*}} X_{f_{x^*}} Y_{f_{x^*}} Z_{f_{x^*}}$ corresponding to the sparse frame $L_{f_{x^*}}$, to obtain $(\hat{p}_{x^*,j^*}, \hat{n}_{x^*,j^*})$, where $\hat{p}_{x^*,j^*} = ($ $$R^*_{wf_{x^*}}$$

$)^T(\hat{p}_{x^*,j^*} - $ $$t^*_{wf_{x^*}}$$

$)$, $\hat{n}_{x^*,j^*} = ($ $$R^*_{wf_{x^*}}$$

$)^T \hat{n}_{x^*,j^*}$, and $$R^*_{wf_{x^*}}$$

and $$t^*_{wf_{x^*}}$$

represent the rotation matrix and translation vector of the optimized pose $$T^*_{wf_{x^*}}$$

from $O_{f_{x^*}} X_{f_{x^*}} Y_{f_{x^*}} Z_{f_{x^*}}$ to the world coordinate system $O_w X_w Y_w Z_w$. The point $(p_{x^*,j^*}, n_{x^*,j^*})$ in $Q_{x^*}$ is replaced with the projected directed geometric point $(\hat{p}_{x^*,j^*}, \hat{n}_{x^*,j^*})$, to update the directed geometric point sets of the N sparse frames before the current frame.

In addition, it is verified that the LiDAR odometry method based on the directed geometric point and the sparse frame in the present invention improves efficiency of frame-to-map matching, realizes a better technical effect, and provides technical support for localization of a service robot in environments such as home, office, and medical care.

Figure 2:
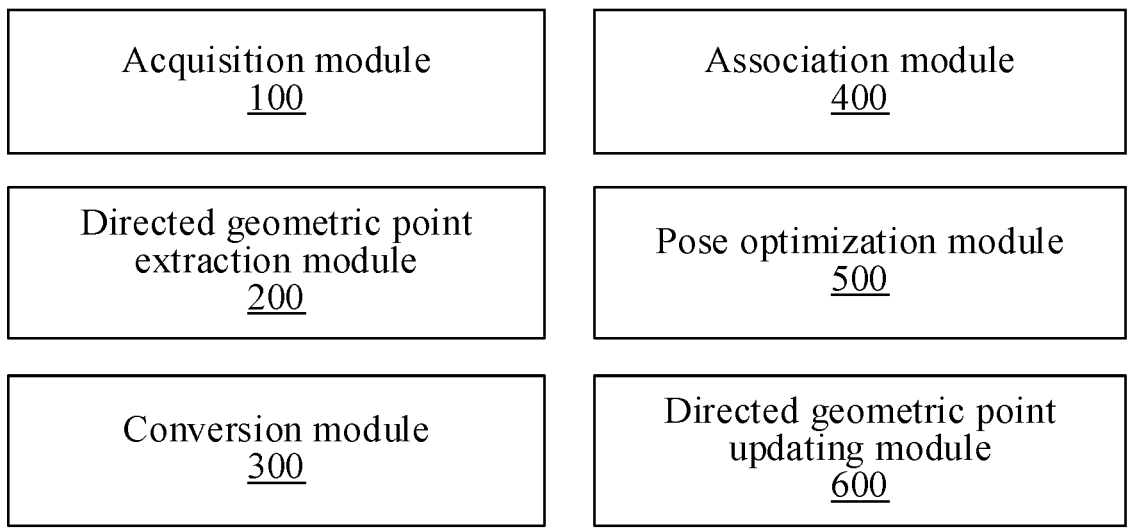
FIG. 2 is a schematic frame diagram of a LiDAR odometry system based on the directed geometric point and the sparse frame according to an embodiment of the present invention.

Embodiment 2 of the present invention provides a LiDAR odometry system based on the directed geometric point and the sparse frame. As shown in FIG. 2, the system includes an acquisition module 100, a directed geometric point extraction module 200, a conversion module 300, an association module 400, a pose optimization module 500, and a directed geometric point updating module 600.

The acquisition module 100 is configured to sense an environment by a service robot through a LiDAR sensor, and obtain original 3D point cloud data of the surrounding environment in the coordinate system of the current frame of the LiDAR sensor.

The directed geometric point extraction module 200 is configured to select the planar points from the original 3D point cloud data, perform clustering on the planar points to obtain planar point sets, perform plane fitting on each planar point set, use the central position and unit normal vector of each fitted plane as the position and direction of corresponding directed geometric point, construct the first directed geometric point set based on the obtained directed geometric points, and merge directed geometric point sets corresponding to N sparse frames before the current frame to obtain the first environmental directed geometric point set, where the sparse frames are selected from all frames obtained by the LiDAR sensor based on a predetermined pose spacing threshold.

The conversion module 300 is configured to convert the first directed geometric point set into the second directed geometric point set in the world coordinate system based on the directed geometric point conversion relationship between the coordinate system of the current frame of the LiDAR sensor and the world coordinate system, and convert the first environmental directed geometric point set into the second environmental directed geometric point set in the world coordinate system based on the directed geometric point conversion relationship between the coordinate systems corresponding to the N sparse frames before the current frame and the world coordinate system.

The association module 400 is configured to calculate candidate associated points in the second environmental directed geometric point set in association with each point in the second directed geometric point set according to a preset data association rule of directed geometric point, and determine the best associated point of each point in the second directed geometric point set.

The pose optimization module 500 is configured to construct a pose optimization function by minimizing a square sum of distances from positions of the points in the second directed geometric point set to planes in which the corresponding best associated points in the second environmental directed geometric point set are located, and obtain an optimized pose from the coordinate system of the current frame of the LiDAR sensor to the world coordinate system by solving the pose optimization function using LM algorithm, where the plane in which the best associated point is located refers to the one that passes through the position of the best associated point and regards the direction of the best associated point as its normal vector.

The directed geometric point updating module 600 is configured to calculate a spacing between the optimized pose from the coordinate system of the current frame of the LiDAR sensor to the world coordinate system and the optimized pose corresponding to the nearest sparse frame; and when the spacing is greater than or equal to the predetermined pose spacing threshold, use the current frame as a new sparse frame, and generate the directed geometric point set corresponding to the current frame based on the best associated points, otherwise, update the directed geometric point sets of the N sparse frames before the current frame based on the points in the second directed geometric point set; and then return to the acquisition module 100.

Those skilled in the art can clearly understand that, for convenience and brevity of description, reference can be made to corresponding processes in the foregoing method embodiments for a specific working process and a related description of the above-described system. Details are not described herein again.

It should be noted that the LiDAR odometry system based on the directed geometric point and the sparse frame in the above embodiment is illustrated only based on division of the above functional modules. In practical application, the foregoing functions may be completed by different functional modules according to needs. That is, the modules or steps in the embodiments of the present invention can be decomposed or combined again, for example, the modules of the above embodiments can be combined into one module or further divided into a plurality of sub-modules to complete all or part of the functions described above. In the embodiments of the present invention, names of the modules and steps are only intended to distinguish between the modules or steps, and are not regarded as improper limitations to the present invention.

Embodiment 3 of the present invention provides a storage apparatus, where the storage apparatus stores a plurality of programs, and the programs are loaded and executed by a processor to implement the above LiDAR odometry method based on the directed geometric point and the sparse frame.

Embodiment 4 of the present invention provides a processing apparatus, including a processor and a storage apparatus, where the processor is configured to execute each program; the storage apparatus is configured to store a plurality of programs; and the programs are loaded and executed by the processor to implement the above LiDAR odometry method based on the directed geometric point and the sparse frame.

Those skilled in the art can clearly understand that, for convenience and brevity of description, reference can be made to a corresponding process in the foregoing method embodiment for specific working processes and related descriptions of the above-described storage apparatus and processing apparatus. Details are not described herein again.

Those skilled in the art should be aware that the example modules and method steps described with reference to the embodiments disclosed in this specification can be implemented by electronic hardware, computer software, or a combination thereof. Programs corresponding to the software modules and method steps may be stored in a random access memory (RAM), an internal memory, a read-only memory (ROM), an electrically programmable ROM, an electrically erasable programmable ROM, a register, a hard disk, a removable hard disk, a CD-ROM, or a storage medium of any other form that is well known in the art. In order to clearly illustrate the interchangeability between electronic hardware and software, the composition and steps of each example have been generally described based on functions in the above description. Whether the functions are performed by the electronic hardware or the software depends on particular applications and design constraints of the technical solutions. Those skilled in the art may use different methods to implement the described functions for each specific application, but such implementation should not be considered to be beyond the scope of the present invention.

The terms such as "first", "second", and "third" are intended to distinguish between similar objects, rather than to describe or indicate a specific order or sequence.

The technical solutions of the present invention are described with reference to the preferred implementations shown in the accompanying drawings. Those skilled in the art should easily understand that the protection scope of the present invention is apparently not limited to these specific implementations. Those skilled in the art can make equivalent changes or substitutions to the relevant technical features without departing from the principle of the present invention, and the technical solutions after these changes or substitutions should fall within the protection scope of the present invention.

What is claimed is:

1. A LiDAR odometry method based on directed geometric point and sparse frame, comprising the following steps:

step S100: sensing an environment by a service robot through a LiDAR sensor, and obtaining original three-dimensional (3D) point cloud data of surrounding environment in coordinate system of current frame of the LiDAR sensor;

step S200: selecting planar points from the original 3D point cloud data, performing clustering on the planar points to obtain planar point sets, performing plane fitting on each planar point set, using central position and unit normal vector of each fitted plane as position and direction of corresponding directed geometric point, constructing a first directed geometric point set based on obtained directed geometric points, and merging directed geometric point sets corresponding to N sparse frames before the current frame to obtain a first environmental directed geometric point set, wherein the sparse frames are selected from all frames obtained by the LiDAR sensor based on a predetermined pose spacing threshold;

step S300: converting the first directed geometric point set into a second directed geometric point set in world coordinate system based on a directed geometric point conversion relationship between the coordinate system of the current frame of the LiDAR sensor and the world coordinate system, and converting the first environmental directed geometric point set into a second environmental directed geometric point set in the world coordinate system based on a directed geometric point conversion relationship between coordinate systems corresponding to the N sparse frames before the current frame and the world coordinate system;

step S400: calculating candidate associated points in the second environmental directed geometric point set in association with each point in the second directed geometric point set according to a preset data association rule of directed geometric point, and determining a best associated point of each point in the second directed geometric point set;

step S500: constructing a pose optimization function by minimizing a square sum of distances from positions of the points in the second directed geometric point set to a plane in which the corresponding best associated points in the second environmental directed geometric point set are located, and obtaining an optimized pose from the coordinate system of the current frame of the LiDAR sensor to the world coordinate system by solving the pose optimization function using Levenberg-Marquardt (LM) algorithm, wherein the plane in which the best associated point is located refers to one that passes through the position of the best associated point and regards direction of the best associated point as its normal vector; and step S600: calculating a spacing between the optimized pose from the coordinate system of the current frame of the LiDAR sensor to the world coordinate system and optimized pose corresponding to a nearest sparse frame; and when the spacing is greater than or equal to the predetermined pose spacing threshold, using the current frame as a new sparse frame, and generating a directed geometric point set corresponding to the current frame based on the best associated points, otherwise, updating the directed geometric point sets of the N sparse frames before the current frame based on the points in the second directed geometric point set; and then returning to step S100.

2. The LiDAR odometry method based on the directed geometric point and the sparse frame according to claim 1, wherein in step S200, a method for selecting the planar points from the original 3D point cloud data, performing clustering on the planar points to obtain planar point sets, and performing plane fitting on each planar point set comprises:

extracting the planar points in the original 3D point cloud data according to a geometric point extraction strategy in LiDAR odometry and mapping (LOAM);

performing clustering on the extracted planar points by using a K-dimensional tree (KD-tree) algorithm in point cloud library (PCL) based on a preset search radius to obtain the corresponding planar point sets; and performing plane fitting on each planar point set by using a random sample consensus (RANSAC) algorithm in the PCL.

3. The LiDAR odometry method based on the directed geometric point and the sparse frame according to claim 1, wherein the directed geometric point conversion relationship between the coordinate system of the current frame of the LiDAR sensor and the world coordinate system is as follows:

$$(\hat{p}_i, \hat{n}_i) = (R_{wl}p_i + t_{wl}, R_{wl}n_i)$$

wherein $p_i$ and $n_i$ respectively represent position and direction of the $i^{th}$ directed geometric point in the first directed geometric point set; $R_{wl}$ and $t_{wl}$ respectively represent rotation matrix and translation vector of the initialized pose $T_{wl}$ from the coordinate system $O_l X_l Y_l Z_l$ of the current frame of the LiDAR sensor to the world coordinate system $O_w X_w Y_w Z_w$; when $$l \le 2, T_{wl} = \begin{bmatrix} I & 0 \\ 0 & 1 \end{bmatrix},$$

and 1 represents a 3×3 unit matrix; when l>2, $T_{wl} = T^*_{w(l-1)}(T^*_{w(l-2)})^{-1}T^*_{w(l-1)}$, $T^*_{w(l-2)}$ and $T^*_{w(l-1)}$ respectively represent optimized pose from coordinate system of $(l-2)^{th}$ frame of the LiDAR sensor to the world coordinate system and optimized pose from coordinate system of $(l-1)$th frame of the LiDAR sensor to the world coordinate system, l represents the current frame, and $(\hat{p}_i, \hat{n}_i)$ represents an expression in the world coordinate system of the point $(p_i, n_i)$ in the first directed geometric point set; and the directed geometric point conversion relationship between the coordinate systems corresponding to the N sparse frames before the current frame and the world coordinate system is as follows:

$$(\hat{p}_{x,j}, \hat{n}_{x,j}) = (R^*_{wf_x}p_{x,j} + t^*_{wf_x}, R^*_{wf_x}n_{x,j})$$

wherein $(\hat{p}_{x,j}, \hat{n}_{x,j})$ represents an expression in the world coordinate system of point $(p_{x,j}, n_{x,j})$ in the first environmental directed geometric point set, $R^*_{wf_x}$ and $$t^*_{wf_x}$$

respectively represent rotation matrix and translation vector of optimized pose $$T^*_{wf_x}$$

from coordinate system corresponding to sparse frame $L_{f_x}$ to the world coordinate system, wherein x=1, 2, ..., N, j=1, 2, ... $\|Q_x\|$, and $|Q_x|$ is number of points in a directed geometric point set $Q_x$.

4. The LiDAR odometry method based on the directed geometric point and the sparse frame according to claim 3, wherein in step S400, a method for calculating the candidate associated points in the second environmental directed geometric point set in association with each point in the second directed geometric point set according to the preset data association rule of the directed geometric point comprises:
calculating point-to-point distances between the point in the second directed geometric point set and points in the second environmental directed geometric point set, and selecting points with corresponding point-to-point distances less than a first preset distance threshold in the second environmental directed geometric point set to construct a point set $\Omega_{dd}$; and
calculating point-to-plane distances between the point in the second directed geometric point set and planes in which points in the point set $\Omega_{dd}$ are located, and using points with corresponding point-to-plane distances less than a second preset distance threshold in the point set $\Omega_{dd}$ as the candidate associated points, wherein the plane in which a point in the point set $\Omega_{dd}$ is located refers to the one that passes through the position of this point and regards direction of this point as its normal vector.

5. The LiDAR odometry method based on the directed geometric point and the sparse frame according to claim 3, wherein a method for constructing the pose optimization function is as follows:

$$T^*_{wl} = \underset{T_{wl} \in \mathbb{SE}_3}{\arg\min} \sum_{i=1}^{|P_2|} \|(R_{wl} p_i + t_{wl} - \hat{p}_{x^*, j^*})^\top \hat{n}_{x^*, j^*}\|^2$$

wherein $T^*_{wl}$ represents the optimized pose, $p_i$ represents position of point in the first directed geometric point set in correspondence to point $(\hat{p}_i, \hat{n}_i)$ in the second directed geometric point set, $\hat{p}_{x^*, j^*}$ and $\hat{n}_{x^*, j^*}$ respectively represent position and direction of the best associated point in the second environmental directed geometric point set in association with the point $(\hat{p}_i, \hat{n}_i)$, $(\cdot)^T$ represents matrix transpose operator, $\mathbb{SE}_3$ represents a manifold space where the poses are located, and $|P_2|$ represents number of points in the second directed geometric point set.

6. The LiDAR odometry method based on the directed geometric point and the sparse frame according to claim 1, wherein in step S600, a method for, when the spacing is greater than or equal to the predetermined pose spacing threshold, using the current frame as the new sparse frame, and generating the directed geometric point set corresponding to the current frame based on the best associated points, otherwise, updating the directed geometric point sets of the N sparse frames before the current frame based on the points in the second directed geometric point set, comprises:
when the spacing is greater than or equal to the predetermined pose spacing threshold, using the current frame as the new sparse frame, updating a corresponding points in the second directed geometric point set based on the best associated points, projecting updated points in the second directed geometric point set from the world coordinate system to the coordinate system of the current frame of the LiDAR sensor, and constructing a directed geometric point set corresponding to the current new sparse frame based on projected directed geometric points; or
otherwise, updating the corresponding best associated points based on the points in the second directed geometric point set, projecting each updated best associated point to the coordinate system of the sparse frame corresponding to this updated best association point, and replacing the corresponding points in the sparse frame with the projected directed geometric points.

7. A processing apparatus, comprising a processor and a storage apparatus, wherein the processor is configured to execute each program; the storage apparatus is configured to store a plurality of programs; and the programs are loaded and executed by the processor to implement the LiDAR odometry method based on the directed geometric point and the sparse frame according to claim 1.

8. The processing apparatus according to claim 7, wherein in step S200, a method for selecting the planar points from the original 3D point cloud data, performing clustering on the planar points to obtain planar point sets, and performing plane fitting on each planar point set comprises:
extracting the planar points in the original 3D point cloud data according to a geometric point extraction strategy in LiDAR odometry and mapping (LOAM);
performing clustering on the extracted planar points by using a K-dimensional tree (KD-tree) algorithm in point cloud library (PCL) based on a preset search radius to obtain the corresponding planar point sets; and
performing plane fitting on each planar point set by using a random sample consensus (RANSAC) algorithm in the PCL.

9. The processing apparatus according to claim 7, wherein the directed geometric point conversion relationship between the coordinate system of the current frame of the LiDAR sensor and the world coordinate system is as follows:

$$(\hat{p}_i, \hat{n}_i) = (R_{wl} p_i + t_{wl}, R_{wl} n_i)$$

wherein $p_i$ and $n_i$ respectively represent position and direction of the $i^{th}$ directed geometric point in the first directed geometric point set; $R_{wl}$ and $t_{wl}$ respectively represent rotation matrix and translation vector of the initialized pose $T_{wl}$ from the coordinate system $O_l X_l Y_l Z_l$ of the current frame of the LiDAR sensor to the world coordinate system $O_w X_w Y_w Z_w$; when $$l \leq 2, T_{wl} = \begin{bmatrix} I & 0 \\ 0 & 1 \end{bmatrix},$$

and 1 represents a 3×3 unit matrix; when l>2, $T_{wl} = T^*_{w(l-1)}(T^*_{w(l-2)})^{-1}T^*_{w(l-1)}$, $T^*_{w(l-2)}$ and $T^*_{w(l-1)}$ respectively represent optimized pose from coordinate system of $(l-2)^{th}$ frame of the LiDAR sensor to the world coordinate system and optimized pose from coordinate system of $(l-1)$th frame of the LiDAR sensor to the world coordinate system, l represents the current frame, and $(\hat{p}_i, \hat{n}_i)$ represents an expression in the world coordinate system of the point $(p_i, n_i)$ in the first directed geometric point set; and the directed geometric point conversion relationship between the coordinate systems corresponding to the N sparse frames before the current frame and the world coordinate system is as follows:

$$(\hat{p}_{x,j}, \hat{n}_{x,j}) = (R^*_{wf_x} p_{x,j} + t^*_{wf_x}, R^*_{wf_x} n_{x,j})$$

wherein $(\hat{p}_{x,j}, \hat{n}_{x,j})$ represents an expression in the world coordinate system of point $(p_{x,j}, n_{x,j})$ in the first environmental directed geometric point set, $R^*_{wf_x}$ and $t^*_{wf_x}$ respectively represent rotation matrix and translation vector of optimized pose $T^*_{wf_x}$ from coordinate system corresponding to sparse frame $L_{f_x}$ to the world coordinate system, wherein x=1, 2, ..., N, j=1, 2, ... $\|Q_x\|$, and $|Q_x|$ is number of points in a directed geometric point set $Q_x$.

10. The processing apparatus according to claim 9, wherein in step S400, a method for calculating the candidate associated points in the second environmental directed geometric point set in association with each point in the second directed geometric point set according to the preset data association rule of the directed geometric point comprises:
calculating point-to-point distances between the point in the second directed geometric point set and points in the second environmental directed geometric point set, and selecting points with corresponding point-to-point distances less than a first preset distance threshold in the second environmental directed geometric point set to construct a point set $\Omega_{dd}$; and
calculating point-to-plane distances between the point in the second directed geometric point set and planes in which points in the point set $\Omega_{dd}$ are located, and using points with corresponding point-to-plane distances less than a second preset distance threshold in the point set $\Omega_{dd}$ as the candidate associated points, wherein the plane in which a point in the point set $\Omega_{dd}$ is located refers to the one that passes through the position of this point and regards direction of this point as its normal vector.

11. The processing apparatus according to claim 9, wherein a method for constructing the pose optimization function is as follows:

$$T^*_{wl} = \underset{T_{wl} \in \mathbb{SE}_3}{\arg\min} \sum_{i=1}^{|P_2|} \|(R_{wl} p_i + t_{wl} - \hat{p}_{x^*,j^*})^\top \hat{n}_{x^*,j^*}\|^2$$

wherein $T^*_{wl}$ represents the optimized pose, $p_i$ represents position of point in the first directed geometric point set in correspondence to point $(\hat{p}_i, \hat{n}_i)$ in the second directed geometric point set, $\hat{p}_{x^*,j^*}$ and $\hat{n}_{x^*,j^*}$ respectively represent position and direction of the best associated point in the second environmental directed geometric point set in association with the point $(\hat{p}_i, \hat{n}_i)$, $(\bullet)^T$ represents matrix transpose operator, $\mathbb{SE}_3$ represents a manifold space where the poses are located, and $|P_2|$ represents number of points in the second directed geometric point set.

12. The processing apparatus according to claim 7, wherein in step S600, a method for, when the spacing is greater than or equal to the predetermined pose spacing threshold, using the current frame as the new sparse frame, and generating the directed geometric point set corresponding to the current frame based on the best associated points, otherwise, updating the directed geometric point sets of the N sparse frames before the current frame based on the points in the second directed geometric point set, comprises:
when the spacing is greater than or equal to the predetermined pose spacing threshold, using the current frame as the new sparse frame, updating a corresponding points in the second directed geometric point set based on the best associated points, projecting updated points in the second directed geometric point set from the world coordinate system to the coordinate system of the current frame of the LiDAR sensor, and constructing a directed geometric point set corresponding to the current new sparse frame based on projected directed geometric points; or
otherwise, updating the corresponding best associated points based on the points in the second directed geometric point set, projecting each updated best associated point to the coordinate system of the sparse frame corresponding to this updated best association point, and replacing the corresponding points in the sparse frame with the projected directed geometric points.

13. A LiDAR odometry system based on directed geometric point and sparse frame, comprising an acquisition module, a directed geometric point extraction module, a conversion module, an association module, a pose optimization module, and a directed geometric point updating module, wherein
the acquisition module is configured to sense an environment by a service robot through a LiDAR sensor, and obtain original three-dimensional (3D) point cloud data of surrounding environment in coordinate system of current frame of the LiDAR sensor;
the directed geometric point extraction module is configured to select planar points from the original 3D point cloud data, perform clustering on the planar points to obtain planar point sets, perform plane fitting on each planar point set, use central position and unit normal vector of each fitted plane as position and direction of corresponding directed geometric point, construct a first directed geometric point set based on the obtained directed geometric points, and merge directed geometric point sets corresponding to N sparse frames before the current frame to obtain a first environmental directed geometric point set, wherein the sparse frames are selected from all frames obtained by the LiDAR sensor based on a predetermined pose spacing threshold;

the conversion module is configured to convert the first directed geometric point set into a second directed geometric point set in world coordinate system based on a directed geometric point conversion relationship between the coordinate system of the current frame of the LiDAR sensor and the world coordinate system, and convert the first environmental directed geometric point set into a second environmental directed geometric point set in the world coordinate system based on a directed geometric point conversion relationship between coordinate systems corresponding to the N sparse frames before the current frame and the world coordinate system;

the association module is configured to calculate candidate associated points in the second environmental directed geometric point set in association with each point in the second directed geometric point set according to a preset data association rule of directed geometric point, and determine a best associated point of each point in the second directed geometric point set;

the pose optimization module is configured to construct a pose optimization function by minimizing a square sum of distances from positions of the points in the second directed geometric point set to a plane in which the corresponding best associated points in the second environmental directed geometric point set are located, and obtain an optimized pose from the coordinate system of the current frame of the LiDAR sensor to the world coordinate system by solving the pose optimization function using Levenberg-Marquardt (LM) algorithm, wherein the plane in which the best associated point is located refers to one that passes through the position of the best associated point and regards direction of the best associated point as its normal vector; and the directed geometric point updating module is configured to calculate a spacing between the optimized pose from the coordinate system of the current frame of the LiDAR sensor to the world coordinate system and optimized pose corresponding to a nearest sparse frame; and when the spacing is greater than or equal to the predetermined pose spacing threshold, use the current frame as a new sparse frame, and generate a directed geometric point set corresponding to the current frame based on the best associated points, otherwise, update the directed geometric point sets of the N sparse frames before the current frame based on the points in the second directed geometric point set; and then return to the acquisition module.

14. A storage apparatus, wherein a plurality of programs are stored in the storage apparatus, and the programs are loaded and executed by a processor to implement the LiDAR odometry method based on the directed geometric point and the sparse frame according to claim 1.

15. The storage apparatus according to claim 14, wherein in step S200, a method for selecting the planar points from the original 3D point cloud data, performing clustering on the planar points to obtain planar point sets, and performing plane fitting on each planar point set comprises:

extracting the planar points in the original 3D point cloud data according to a geometric point extraction strategy in LiDAR odometry and mapping (LOAM);

performing clustering on the extracted planar points by using a K-dimensional tree (KD-tree) algorithm in point cloud library (PCL) based on a preset search radius to obtain the corresponding planar point sets; and performing plane fitting on each planar point set by using a random sample consensus (RANSAC) algorithm in the PCL.

16. The storage apparatus according to claim 14, wherein the directed geometric point conversion relationship between the coordinate system of the current frame of the LiDAR sensor and the world coordinate system is as follows:

$$(\hat{p}_i, \hat{n}_i) = (R_{wl} p_i + t_{wl}, R_{wl} n_i)$$

wherein $p_i$ and $n_i$ respectively represent position and direction of the $i^{th}$ directed geometric point in the first directed geometric point set; $R_{wl}$ and $t_{wl}$ respectively represent rotation matrix and translation vector of the initialized pose $T_{wl}$ from the coordinate system $O_l X_l Y_l Z_l$ of the current frame of the LiDAR sensor to the world coordinate system $O_w X_w Y_w Z_w$; when $$l \le 2, T_{wl} = \begin{bmatrix} I & 0 \\ 0 & 1 \end{bmatrix},$$

and 1 represents a 3×3 unit matrix; when $l>2$, $T_{wl} = T^*_{w(l-1)}(T^*_{w(l-2)})^{-1}T^*_{w(l-1)}$, $T^*_{w(l-2)}$ and $T^*_{w(l-1)}$ respectively represent optimized pose from coordinate system of $(l-2)^{th}$ frame of the LiDAR sensor to the world coordinate system and optimized pose from coordinate system of $(l-1)$th frame of the LiDAR sensor to the world coordinate system, l represents the current frame, and $(\hat{p}_i, \hat{n}_i)$ represents an expression in the world coordinate system of the point $(p_i, n_i)$ in the first directed geometric point set; and the directed geometric point conversion relationship between the coordinate systems corresponding to the N sparse frames before the current frame and the world coordinate system is as follows:

$$(\hat{p}_{x,j}, \hat{n}_{x,j}) = (R^*_{wf_x} p_{x,j} + t^*_{wf_x}, R^*_{wf_x} n_{x,j})$$

wherein $(\hat{p}_{x,j}, \hat{n}_{x,j})$ represents an expression in the world coordinate system of point $(p_{x,j}, n_{x,j})$ in the first environmental directed geometric point set, $$R^*_{wf_x}$$

and $$t^*_{wf_x}$$

respectively represent rotation matrix and translation vector of optimized pose $$T^*_{wf_x}$$

from coordinate system corresponding to sparse frame $L_{f_x}$ to the world coordinate system, wherein x=1, 2, ..., N, j=1, 2, ... |Q_x|, and |Q_x| is number of points in a directed geometric point set Q.

17. The storage apparatus according to claim 16, wherein in step S400, a method for calculating the candidate associated points in the second environmental directed geometric point set in association with each point in the second directed geometric point set according to the preset data association rule of the directed geometric point comprises:
   calculating point-to-point distances between the point in the second directed geometric point set and points in the second environmental directed geometric point set, and selecting points with corresponding point-to-point distances less than a first preset distance threshold in the second environmental directed geometric point set to construct a point set $\Omega_{dd}$; and
   calculating point-to-plane distances between the point in the second directed geometric point set and planes in which points in the point set $\Omega_{dd}$ are located, and using points with corresponding point-to-plane distances less than a second preset distance threshold in the point set $\Omega_{dd}$ as the candidate associated points, wherein the plane in which a point in the point set $\Omega_{dd}$ is located refers to the one that passes through the position of this point and regards direction of this point as its normal vector.

18. The storage apparatus according to claim 16, wherein a method for constructing the pose optimization function is as follows:

$$T^*_{wl} = \underset{T_{wl} \in \mathbb{SE}_3}{\mathrm{argmin}} \sum_{i=1}^{|P_2|} \|( R_{wl} p_i + t_{wl} - \hat{p}_{x^*,j^*} )^T \hat{n}_{x^*,j^*} \|^2$$

wherein $T^*_{wl}$ represents the optimized pose, $p_i$ represents position of point in the first directed geometric point set in correspondence to point $(\hat{p}_i, \hat{n}_i)$ in the second directed geometric point set, $\hat{p}_{x^*,j^*}$ and $\hat{n}_{x^*,j^*}$ respectively represent position and direction of the best associated point in the second environmental directed geometric point set in association with the point $(\hat{p}_i, \hat{n}_i)$, $(\bullet)^T$ represents matrix transpose operator, $\mathbb{SE}_3$ represents a manifold space where the poses are located, and $|P_2|$ represents number of points in the second directed geometric point set.

19. The storage apparatus according to claim 14, wherein in step S600, a method for, when the spacing is greater than or equal to the predetermined pose spacing threshold, using the current frame as the new sparse frame, and generating the directed geometric point set corresponding to the current frame based on the best associated points, otherwise, updating the directed geometric point sets of the N sparse frames before the current frame based on the points in the second directed geometric point set, comprises:
   when the spacing is greater than or equal to the predetermined pose spacing threshold, using the current frame as the new sparse frame, updating a corresponding points in the second directed geometric point set based on the best associated points, projecting updated points in the second directed geometric point set from the world coordinate system to the coordinate system of the current frame of the LiDAR sensor, and constructing a directed geometric point set corresponding to the current new sparse frame based on projected directed geometric points; or
   otherwise, updating the corresponding best associated points based on the points in the second directed geometric point set, projecting each updated best associated point to the coordinate system of the sparse frame corresponding to this updated best association point, and replacing the corresponding points in the sparse frame with the projected directed geometric points.

* * * * *